Patented Aug. 11, 1931

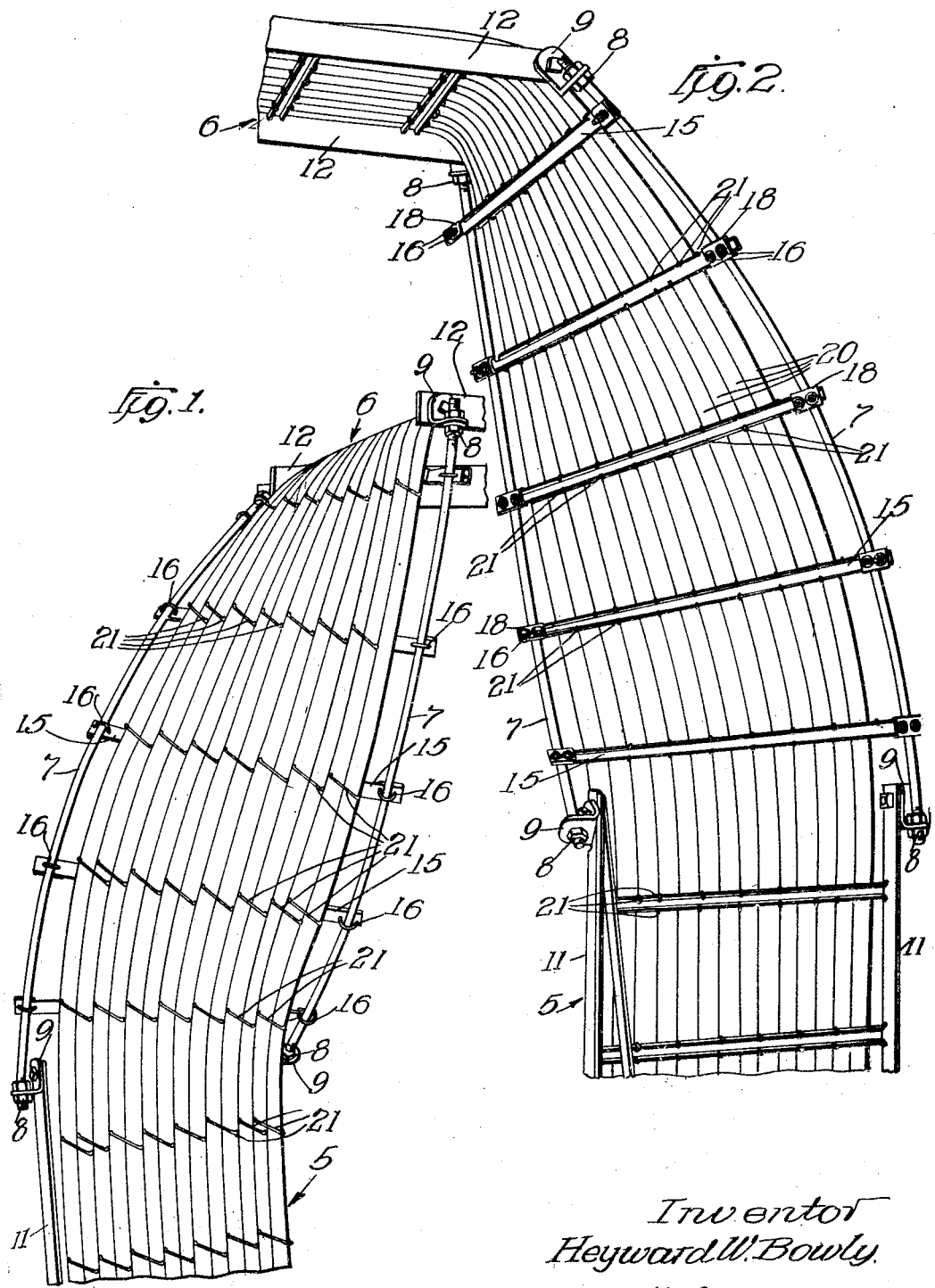

1,818,602

UNITED STATES PATENT OFFICE

HEYWARD WIRGMAN BOWLY, OF SUMMIT, NEW JERSEY, ASSIGNOR TO WESTERN ELECTRIC COMPANY, INCORPORATED, OF NEW YORK, N. Y., A CORPORATION OF NEW YORK

SUPPORT FOR STRAND MATERIAL

Application filed March 25, 1929. Serial No. 349,577.

This invention relates to a support for strand material, and more particularly to a rack for supporting a curved formation of cables within a telephone exchange.

In telephone exchanges the electrical conductors interconnecting the apparatus are frequently enclosed in flexible cables supported in groups or runs upon suitable frameworks or racks. In conducting such cables, from one plane to another, it has heretofore been the practice in some instances to employ a rack having a twisted or spiralled formation.

An object of this invention is to provide a simple and efficient structure for conducting strands from one plane to another which may be used under widely varying conditions.

In accordance with this object, one embodiment of the invention consists of a pair of spaced rods that are secured to the ends of the racks between which cables are to be conducted, which rods are curved to conform to the shape of the turn which it is desired to give the cables. Transverse members are secured to the rods at suitably spaced positions to which the cables may be suitably attached by clamping members.

A clear understanding of the invention will be had from the following description when taken in connection with the accompanying drawings, wherein Fig. 1 is a fragmentary front view of a cable run employing a structure embodying features of the invention, and Fig. 2 is a rear view thereof.

Referring now to the drawings in which like numerals designate similar parts in the figures, there is disclosed a vertical cable rack designated generally by the numeral 5, interconnected with a horizontal cable rack 6 which is turned at right angles to the vertical rack. A pair of spaced rods or tubes 7 are curved to conform to the shape of the spiral curve which it will be necessary for the cables to assume in passing from rack 5 to 6. The rods 7 are threaded at their ends and are secured by nuts 8 threaded thereon to angle pieces 9 that are retained by bolts to the ends of parallel side bars 11 and 12, composing the racks. The rods 7 form the necessary supporting framework for conducting the cables from one rack to the other and may be bent into any desired shape, to suit the conditions of any formation of cables. Thus it will be understood that these rods do not require the computation and design that a more complicated structure would in order to form the desired curve, but are readily shaped and adjusted to whatever curve it is desired to form.

With the rods 7 curved to the desired shape and secured by the angle pieces 9 to the racks 5 and 6, transverse U-shaped channel members 15 are secured to the rods 7 at suitably spaced positions to support the cables. The closed sides or webs of the channel members are exposed to the cables so that the flanges of the channel members may be used for clamping the cables thereto as described below. These channel members 15 are secured to the rods 7 by means of U-bolts 16 which encircle the rods and project through the ends of the channel members and plates 18 on the undersides thereof, and nuts secure the U-bolts in position. It may be necessary in some cases to twist the channel members slightly as shown so that they will conform to the curve provided by the rods 7 and be properly secured to these rods.

The structure provided by the rods 7 and the transverse channel members 15 furnishes the necessary curved framework for bridging the cables from rack 5 to rack 6, and cables 20 may be placed on this framework and secured thereto by wire clips 21 of the type disclosed and claimed in the patent to G. J. Houts, No. 1,719,609, issued July 2, 1929 each of which clips surrounds a pair of cables and is clamped to the underside of the channel members 15. Thus the required structure for conducting the cables from rack 5 to rack 6 is complete. It is of course to be understood that additional cables may be secured to those shown to form additional layers as disclosed in the above identified patent. In addition to the simplicity of construction, it will be noted that the apparatus supports the cables in an orderly spiral formation and the entire lengths of the cables are thereby held in a proper manner in relatively fixed positions.

It is of course to be understood that the invention is not limited to the specific embodiment herein described and illustrated, but is to be limited only by the scope of the appended claims.

What is claimed is:

1. A framework for supporting a plurality of parallel strands extending in spiral formation from a rack in one plane to a rack in another plane, comprising a plurality of spaced rods conforming to the spiral formation of the strands and having threaded ends, means projecting from the racks in the different planes for receiving the threaded ends of the rods, and double nuts for securing the threaded ends of the rods to the projections.

2. A framework for supporting a plurality of parallel strands extending in spiral formation from a rack in one plane to a rack in another plane, comprising a plurality of spaced rods interconnecting the racks and conforming to the spiral formation of the strands, and angular members for securing the ends of the rods to the two racks.

3. A framework for supporting a plurality of parallel strands extending in spiral formation from a rack in one plane to a rack in another plane, comprising a plurality of spaced rods interconnecting the racks and conforming to the spiral formation of the strands, a plurality of spaced members transverse to the rods for supporting the strands, and U-bolt members for adjustably securing the transverse members to the rods.

4. A framework for supporting a plurality of parallel strands extending in spiral formation from a rack in one plane to a rack in another plane, comprising a plurality of spaced rods interconnecting the racks and conforming to the spiral formation of the strands, a plurality of inverted spaced channel members secured transversely to the rods for supporting the strands, and means clamping over the undersides of the channel members for securing the strands thereto.

5. A framework for supporting a plurality of parallel strands extending in spiral formation from a rack in one plane to a rack in another plane, comprising a plurality of spaced rods conforming to the spiral formation of the strands, and means associated with the racks in the different planes for securing the ends of the rods thereto.

6. A framework for supporting a plurality of parallel strands extending in spiral formation from a rack in one plane to a rack in another plane, comprising a plurality of spaced rods interconnecting the racks and conforming to the spiral formation of the strands, a plurality of spaced members transverse to the rods for supporting the strands, and means for adjustably securing the transverse members to the rods.

In witness whereof, I hereunto subscribe my name this 18th day of March, A. D. 1929.

HEYWARD WIRGMAN BOWLY.